(12) United States Patent
Standke

(10) Patent No.: US 7,618,291 B2
(45) Date of Patent: Nov. 17, 2009

(54) ELECTRICAL PLUG CONNECTION WITH A TRANSPONDER PROVIDED IN A CODING PIN

(75) Inventor: Kurt Standke, Bonn (DE)

(73) Assignee: REMA Lipprandt GmbH & Co. KG, Bonn (DE)

( * ) Notice: Subject to any disclaimer, the term of this patent is extended or adjusted under 35 U.S.C. 154(b) by 0 days.

(21) Appl. No.: 12/066,416

(22) PCT Filed: Sep. 26, 2006

(86) PCT No.: PCT/EP2006/009347

§ 371 (c)(1),
(2), (4) Date: Aug. 11, 2008

(87) PCT Pub. No.: WO2007/036346

PCT Pub. Date: Apr. 5, 2007

(65) Prior Publication Data

US 2008/0318477 A1    Dec. 25, 2008

(30) Foreign Application Priority Data

Sep. 27, 2005    (DE) ........................ 10 2005 046 040

(51) Int. Cl.
*H01R 13/66*    (2006.01)
(52) U.S. Cl. ................................. 439/620.01
(58) Field of Classification Search ............ 439/620.01, 439/133, 378, 374, 680
See application file for complete search history.

(56) References Cited

U.S. PATENT DOCUMENTS

| | | | | | |
|---|---|---|---|---|---|
| 4,207,468 | A | * | 6/1980 | Wilson | 250/341.1 |
| 4,642,734 | A | * | 2/1987 | Anderson | 361/820 |
| 4,912,290 | A | * | 3/1990 | Tanaka et al. | 200/61.66 |
| 5,459,450 | A | * | 10/1995 | Beghelli | 340/538 |
| 5,841,363 | A | * | 11/1998 | Jakob et al. | 340/5.26 |
| RE38,348 | E | * | 12/2003 | Bloss et al. | 340/870.02 |
| 7,167,078 | B2 | * | 1/2007 | Pourchot | 340/5.61 |
| 7,463,831 | B2 | * | 12/2008 | Wang et al. | 398/164 |
| 2005/0184856 | A1 | | 8/2005 | Pourchot | |

FOREIGN PATENT DOCUMENTS

| | | |
|---|---|---|
| DE | 296 12 378 U1 | 10/1996 |
| DE | 298 15 964 U1 | 1/1999 |
| DE | 298 19 512 U1 | 5/1999 |
| DE | 199 43 226 A1 | 4/2000 |
| DE | 101 48 419 A1 | 4/2003 |
| DE | 203 18 583 U1 | 3/2005 |
| EP | 02 33 638 A2 | 8/1987 |
| EP | 09 21 607 A2 | 6/1999 |
| EP | 1 538 713 A1 | 6/2005 |

* cited by examiner

*Primary Examiner*—Chandrika Prasad
(74) *Attorney, Agent, or Firm*—Sughrue Mion, PLLC

(57) ABSTRACT

An electrical plug connection for connecting a consumer or a charging device to a battery. The plug connection includes a plug part and a socket part. The part of the plug connection located on the battery side is provided with a transponder (15) in which data suitable for identifying the battery is stored.

7 Claims, 2 Drawing Sheets

ELECTRICAL PLUG CONNECTION WITH A TRANSPONDER PROVIDED IN A CODING PIN

Figure 1:
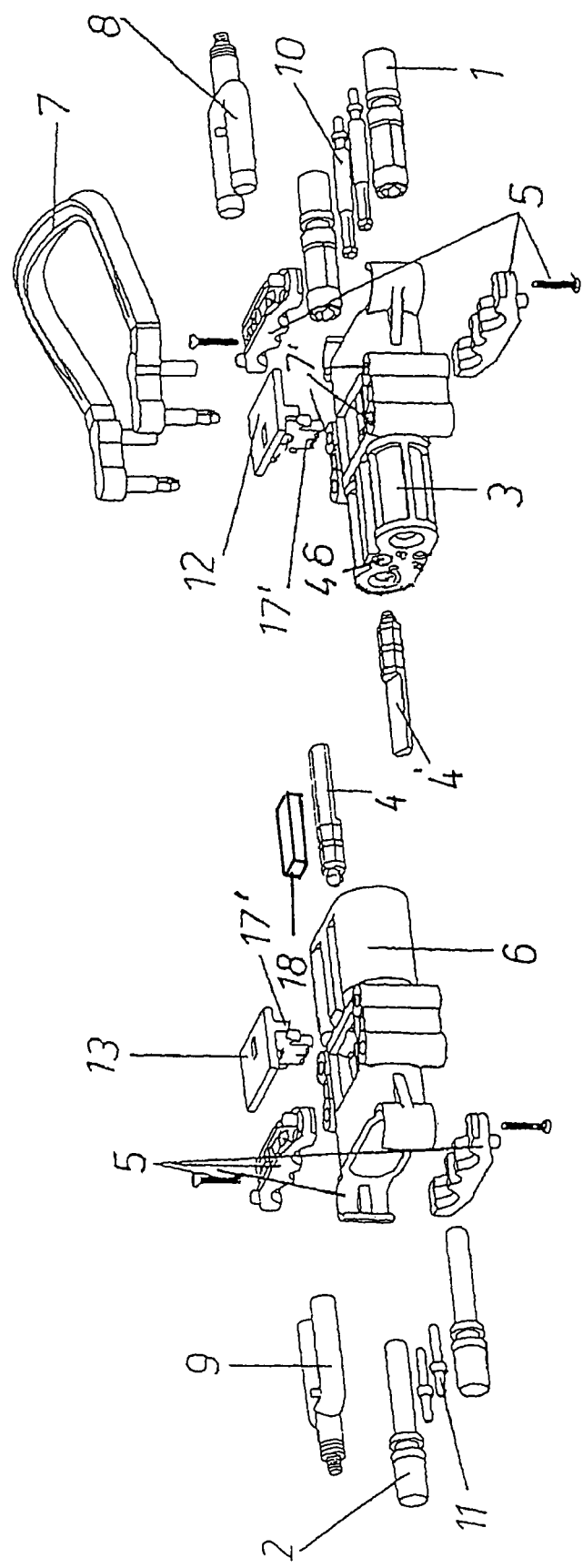

The invention relates to an electric plug connection for connecting a consumer or a charging device to a battery and a method for identifying a battery. Such a plug connection, comprising a plug part and a socket part, is known from EP 821 444 B1, for example. It serves in particular to establish an electric connection between batteries of electric industrial trucks such as forklifts and control and/or regulating equipment for the drives of electric industrial trucks or for establishing an electric connection between these batteries and charging devices for batteries comprising the control and/or regulating equipment by means of which the charging parameters and charging characteristic are adaptable to a particular battery.

Depending on the type of vehicle and the intended application, batteries of different designs are used with electric industrial trucks. Examples include dry batteries, gel batteries and wet batteries, etc.

To maximize the efficiency and service life of these batteries, it is necessary for them to be discharged with a specific discharge characteristic as a function of specific parameters such as design, nominal voltage, capacitance, residual charge, age, number of charge cycles, etc., and to be charged again with a specific charge characteristic.

With modern consumer controls, e.g., driving controls in industrial trucks, battery histories can be stored. This stored data is used to adapt parameters such as withdrawal of charge or resupply of electric power to the respective battery history by varying the acceleration or maximal speed values.

The battery history is also of interest for determining appropriate lease charges for a battery because not only the total operating time or the number of total charge cycles but also the charge and discharge details in a battery are important for the stability and life expectancy of the batteries.

Although the electric plug connection according to EP 821 444 B1 comprises coding pins which allow the plug part and socket part to be connected only when the proper voltage for the battery has been set on the plug part on the consumer end or on the charging device end, but the choice of the charging or discharging characteristic is the responsibility of the operating person on the basis of the random knowledge or information about the available battery in the vehicle, for example. Therefore little attention is devoted in practice to adapting the charge or discharge characteristics, so the efficiency and lifetime of batteries suffer.

Furthermore, in renting or leasing batteries or vehicles including batteries, for example, the consumption costs are based only on the use time of the battery and/or the vehicle. However, it would be desirable to take into account special operating states, in particular those that are not allowed such as a total discharge or excessively high temperatures of the battery during charging or discharging.

Therefore, the object of the present invention is to create an electric plug connection and a method for identifying a battery.

This object is achieved with regard to the device by the electric plug connection characterized in Claim 1.

Due to the fact that the part of the plug connection on the battery end comprises a transponder in which data suitable for identifying the battery is stored, the respective battery can be identified automatically by means of a suitable reader in cases where its exact identify is important in ascertaining characteristic quantities.

A first essential exemplary embodiment of the inventive electric plug connection is the connection of the battery to the charging device. The charge characteristics can be set on the basis of the data stored for this battery by the identification of the battery by means of the reader in an unambiguous manner.

In the simplest case, the reader may be a handheld reader to be operated by the operating person. The choice and setting of the charge characteristics are then also made manually on the basis of data stored for this battery.

However, it is preferable if the part of the plug connection on the charging device end comprises the reader for reading data stored by the transponder. If the charging device has a memory device which contains the optimal charging parameters for the respective accumulator, so these parameters can be output with the help of the reader when the connection is established between the charging device and the battery and, if the charging device is equipped with a suitable control and/or regulating unit, they may be automatically adapted to the respective battery.

If a plurality of different charging devices is available in particular, then by identifying the respective battery, e.g., by means of a reader at the input of a charging area comprising the charging devices, the charging device that appears most suitable can be automatically displayed for the operating person, e.g., by optical and/or acoustic signals.

In another exemplary embodiment of the inventive plug device, a reader is provided on the electric industrial truck itself, especially preferably on the drive-end part of the plug connection. Unambiguous identification of the battery then allows the operating person to manually adapt the control and/or regulating equipment of the drive of the electric industrial truck to this battery. Or the adaptation of the control and/or regulating equipment is performed automatically when the reader is connected to the control and/or regulating equipment and it includes a memory for battery-specific storage of operating data and the operational history as well as means for adapting the discharge parameters to this data.

Furthermore, it is possible to connect the reader to a device which contains the data on the history of the respective battery and to use this data for determining the operating cost of the battery. In particular, when the electric industrial vehicle and/or the battery is rented or leased, this data may be used for automatic billing of operating costs by assigning the data to the respective battery thereby identified.

In addition, it is also conceivable to use readers for identification of the respective battery at all locations where information about the respective battery is important. For example, on the basis of battery histories recorded by control and/or regulating equipment of the drives of the industrial trucks and control and/or regulating equipment of the charging devices, maintenance schedules, cost schedules and charging schedules can be created and then retrieved automatically after identification and implemented, if necessary.

Figure 2:
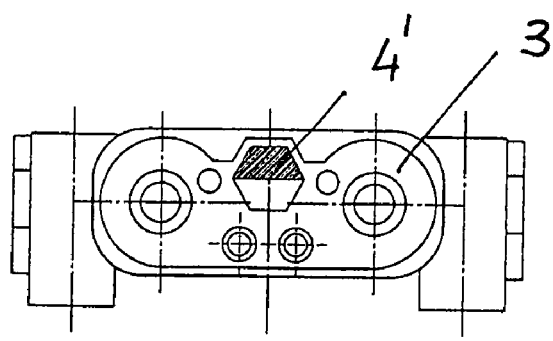
Figure 3:
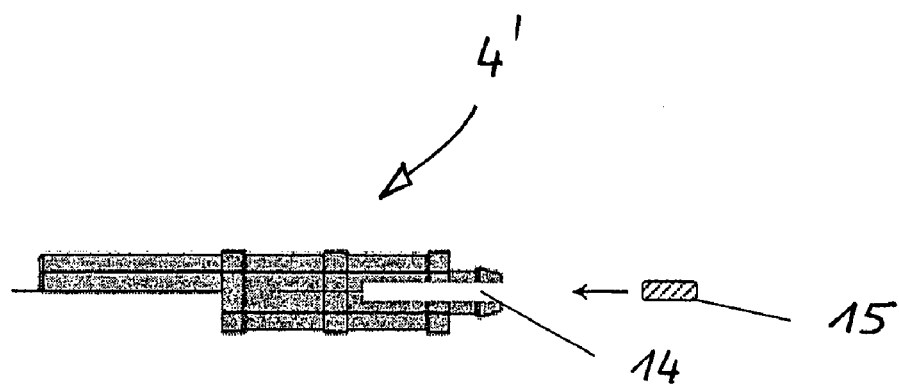
Figure 4:
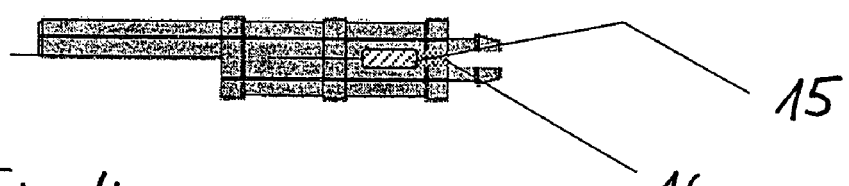

The drawing illustrates an exemplary embodiment of the inventive electric plug connection, in which:

FIG. 1 shows an exploded diagram of the essential parts of the electric plug connection in a perspective view, FIG. 2 shows a view of the electric plug face of the socket part on the battery end, FIG. 3 shows the coding pin of the socket part on the battery end in a detail diagram in a view from the side and FIG. 4 shows the coding pin in a view corresponding to that in FIG. 3 in the assembled state.

The electric plug device according to FIG. 1 comprises the parts of a device plug shown at the left and the parts of a device socket shown at the right, namely the main contact tubes 1 and the main contact pins 2, the contact receptacle part 3 of the device socket, the contact receptacle part 6 of the device plug, the coding pins 4, 4' of the device socket and the device plug that can be plugged together via fitting surfaces, flex grips 5 for guiding the electric line and an air hose which may be connected to fluid/air contact parts of the device plug, a handle 7 for the device socket or the device plug for better handling, a holder 7' for the handle, fluid/air contact parts 8, 9 of the device plug and the device socket, pilot contact tubes 10 and pilot contact pins 11 applied centrally to the main contacts, a closure part 12 for the device socket and a closure part 13 for the device plug, such that the latter each include a lower locking plate 17, 17'.

Above the coding pin 4, a reader 18 by means of which the data stored by the transponder can be read out is provided on the contact receptacle 6 of the device plug, which may be connected to a charging device or a consumer, for example. The data read out by the reader is then utilized to either identify the respective battery to adapt the charging characteristics of a charging device (not shown) to the respective battery manually, for example, or if the charging device is designed suitably, to adapt the charging characteristics automatically.

In addition, a reader may be arranged at a location by which an industrial truck that is to be charged passes by. On the basis of the identification performed by this reader, then the charging device of a plurality of charging devices, for example, whose charging characteristics come closest to the requirements of the battery or which is available next of many charging devices is selected. This charging device may be characterized by automatically activated optical means, such as lights, for example.

As shown in FIGS. 3 and 4 in particular, where the coding pin 4' of the part of the electric plug connection on the battery side is shown, a slot 14 is created in the coding pin from the end pointing away from the electric plug face. A transponder 15 is inserted into this slot and is connected by integral bond to the coding pin with the help of a casing compound 16.

The use of the electric plug connection is by no means limited to the exemplary embodiments described here. Instead, its use is always conceivable and advantageous whenever automatic identification of a battery is desirable.

LIST OF REFERENCE NUMERALS

1 Main contact tubes
2 Main contact pins
3 Contact receptacle part of the device socket
4, 4' Coding pins
5 Flex grip
6 Contact receptacle part of the device plug
7 Handle
7' Holder
8 Fluid/air contact part
9 Fluid/air contact part
10 Pilot contact tubes
11 Pilot contact pins
12 Closure part
13 Closure part
14 Slot
15 Transponder
16 Casting compound
17, 17' Locking plates
18 Reader

The invention claimed is:

1. An electric plug connection for connecting a consumer or a charging device to a battery on a battery side of the connection, comprising a plug part and a socket part, wherein either the plug part or the socket part is provided on the battery side, wherein the part of the plug connection provided on the battery side comprises a transponder in which data suitable for identifying the battery is stored, and wherein the transponder is provided in a coding pin for coding the plug connection for a certain battery voltage.

2. The electric plug connection according to claim 1, wherein the plug part has a plug face and the transponder is inserted with an integral bond into a recess provided in the end of the coding pin facing away from the plug face.

3. The electric plug connection according to claim 1, wherein the consumer or the charging device is on a charging device side of the connection, and wherein the part of the plug connection provided on the charging device side comprises a reader for reading the data stored by the transponder.

4. A coding pin for an electric plug connection according to claim 2.

5. The electric plug connection according to claim 2, wherein the consumer or the charging device is on a charging side of the connection, and wherein the part of the plug connection provided on the charging device side comprises a reader for reading the data stored by the transponder.

6. A coding pin for an electric plug connection according to claim 3.

7. An electric plug connection for connecting a consumer or a charging device to a battery, comprising a plug part and a socket part, such that the part of the plug connection on the battery end comprises a transponder in which data suitable for identifying the battery is stored, wherein the transponder is provided in a coding pin for coding the plug connection for a certain battery voltage.

* * * * *